United States Patent [19]

Beardmore et al.

[11] Patent Number: 4,633,722

[45] Date of Patent: Jan. 6, 1987

[54] GYROSCOPE APPARATUS

[76] Inventors: Geoffrey Beardmore, 20 Oak Manor Drive; Nicholas R. Capaldi, 50 Albemarle Gate, both of Cheltenham, Gloucestershire, England

[21] Appl. No.: 581,746

[22] Filed: Feb. 21, 1984

[30] Foreign Application Priority Data

Feb. 25, 1983 [GB] United Kingdom ............... 8305250

[51] Int. Cl.[4] ............................................. G01C 19/30
[52] U.S. Cl. ....................................... 74/5.46; 74/5 F; 74/5.6 D
[58] Field of Search ................ 74/5.46, 5.6 D, 5 F, 74/5.47, 5.5, 5.7, 5 R

[56] References Cited

U.S. PATENT DOCUMENTS

| | | | |
|---|---|---|---|
| 2,595,268 | 5/1952 | Kellogg | 74/5.5 X |
| 2,608,867 | 9/1952 | Kellogg et al. | 74/5.47 X |
| 3,186,239 | 6/1965 | Emmerich | 74/5 R |
| 3,365,960 | 1/1968 | Siff et al. | 74/5 F X |
| 3,490,297 | 1/1970 | Brodersen | 74/5.46 |
| 3,886,803 | 6/1975 | Jacobson et al. | 74/5.7 X |
| 4,437,354 | 3/1984 | Capaldi | 74/5.46 |

Primary Examiner—Rodney H. Bonck
Attorney, Agent, or Firm—Pollock, Vande Sande & Priddy

[57] ABSTRACT

A single-axis servoed rate gyroscope has a sealed gimbal assembly that is mounted by bearings for angular displacement about a rotational axis, at right angles to the gyroscope spin axis. The gyroscope torquer comprises a circular, cylindrical coil mounted at the bottom of the gimbal assembly, coaxially of the spin axis and below the rotational axis. The coil extends in an annular gap formed between a cylindrical permanent magnet, mounted on the gyroscope base structure, and a part of the base structure which surrounds the magnet and which provides a magnetic return path. The magnet is polarized at right angles to the spin axis and the rotational axis, so that energization of the coil causes a restoring torque on the gimbal assembly about the rotational axis. The bearings are located in V-shape slots formed in the base structure surrounding the gimbal assembly. A capacitive pick-off is mounted on top of the gimbal assembly, and an electronic control unit in the form of several circuit boards is mounted above the gimbal assembly.

10 Claims, 3 Drawing Figures

GYROSCOPE APPARATUS

BACKGROUND OF THE INVENTION

This invention relates to gyroscope apparatus.

The invention is more particularly concerned with single-axis servoed rate gyroscopes.

Gyroscopes of this kind have a rotor, such as in the form of an inertia ring, that is rotated at high speed by a motor, about a spin axis. The rotor is mounted in a gimbal that is in turn mounted by bearings or pivots for angular displacement about a rotational axis, at right angles to the spin axis. Any displacement of the gyroscope having a rotational component about an input axis, at right angles to the spin and rotational axis, produces angular displacement of the gimbal about the rotational axis. In servoed rate gyroscopes this angular displacement is sensed and a restoring torque is applied to the gimbal so as to maintain its datum position. Usually, the torque is applied by means of an electromagnetic torquer, a measure of the angular velocity of the gyroscope about the input axis being derived from the current supplied to the torquer in order to maintain the gimbal in its datum position.

Various configurations of gyroscope have been proposed in the past but these are generally bulky or difficult to manufacture and assemble accurately at low cost.

BRIEF SUMMARY OF THE INVENTION

It is an object of the present invention to provide gyroscope apparatus that may be made accurately at relatively low cost, and that can have a compact construction.

According to the present invention there is provided a single-axis servoed rate gyroscope including a gimbal assembly comprising an inertia member and a motor arranged to rotate the inertia member about a first axis, the motor and inertia member being arranged concentrically of one another; bearing means mounting the gimbal assembly for angular displacement about a second axis at right angles to the first axis; and sensor means arranged to sense displacement of the gimbal assembly about the second axis, the gyroscope including torquer means comprising a coil of cylindrical shape mounted at one end of the gimbal assembly coaxially of the first axis and spaced from the second axis, and a permanent magnet fixedly mounted with the gyroscope such that a part at least of the magnet extends coaxially of the first axis within the coil with a part at least of the magnetic field of said magnet passing through the windings of the coil, such that a restoring torque about the second axis can be applied to the gimbal assembly by energising the coil.

The magnet may be polarised substantially at right angles to both the first axis and the second axis. The coil and magnet may be circular in section. The gyroscope may include a cylindrical magnetic element that surrounds the permanent magnet and provides a magnetic return path therefor, and a part at least of the coil may extend between the permanent magnet and the magnetic element. The magnetic element may form a part of the gyroscope housing. The gimbal assembly may be mounted by first and second bearings, and the bearings may be supported in respective slots in a base structure of the gyroscope surrounding the gimbal assembly. A part at least of the slots may be of V-shape. That part of each bearing supported in the slots may be of circular shape. Each of the bearings may be secured in its respective slot by means of a strap member that bridges the slot and contacts the bearing. The gimbal assembly may be supported by first and second bearings in the form of flexure pivots. The inertia member may be supported by gas-lubricated bearing means. The inertia member may be in the form of a ring that is mounted concentrically within an outer stator assembly of the motor. The gimbal assembly may be a sealed unit. The sensor may be mounted at an end of the gimbal assembly, and in this respect, it may be mounted at an end of the gimbal assembly remote from said one end. The sensor means may be a capacitive sensor including two electrodes, one electrode being secured with the gimbal assembly and the other electrode being fixedly mounted with the gyroscope. The gyroscope may include an electronic control unit mounted at one end of the gyroscope, and the control unit may include a plurality of circuit boards stacked one on top of the other. The electronic control unit may be mounted at the end of the gyroscope remote from the torquer means. The gyroscope may have a housing comprising: a base structure on which the gimbal assembly is mounted for angular displacement relative to the base structure, about the second axis; and a cylindrical cap which is sealed with the base structure and encloses the gimbal assembly.

By mounting the torque coil coaxially with the inertia ring a gyroscope of compact construction can be produced. Assembly of the gyroscope is also facilitated. The construction readily enables alterations and modifications to be made to various components of the gyroscope without the need to completely redesign the overall construction.

A gyroscope in accordance with the present invention will now be described, by way of example, with reference to the accompanying drawings.

DETAILED DESCRIPTION

Figure 1:
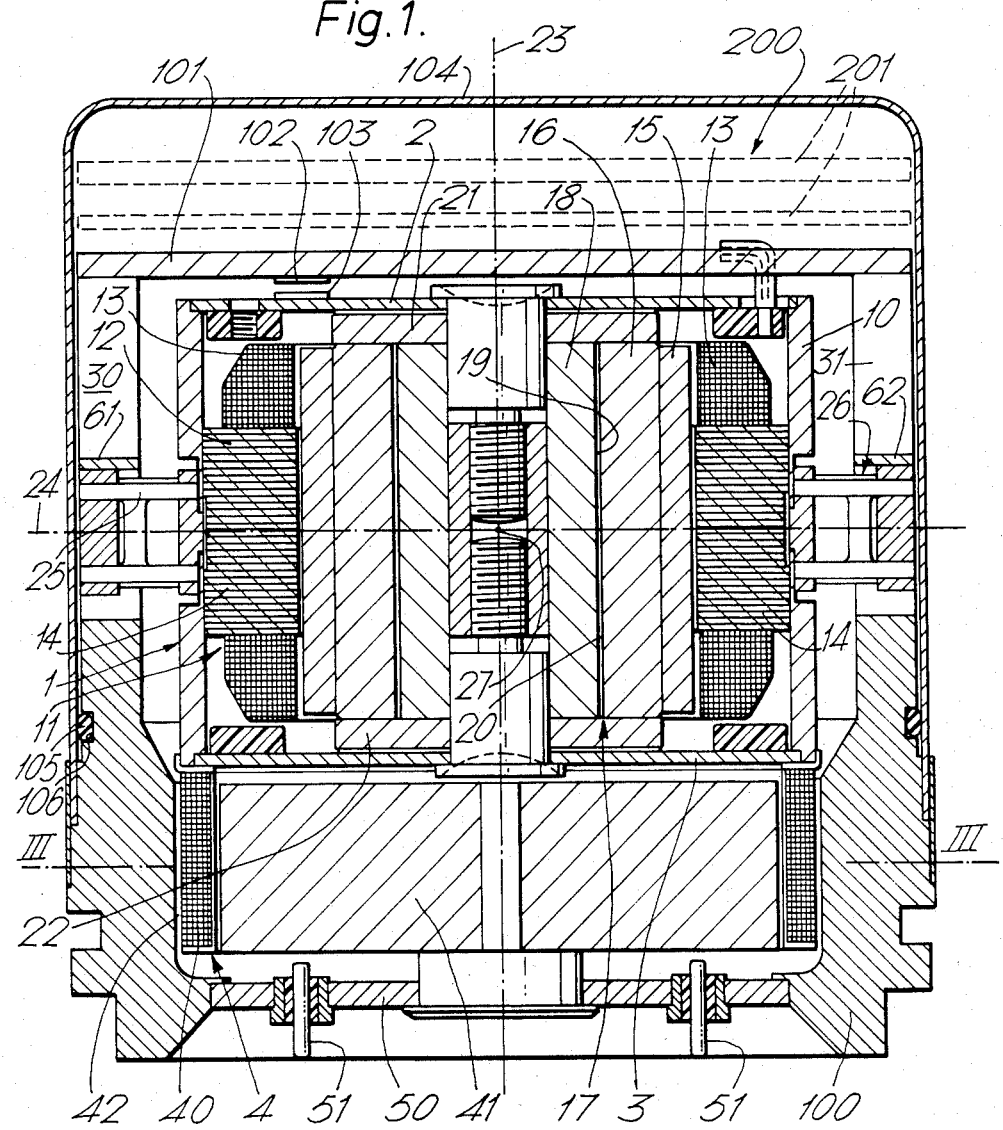
FIG. 1 is a sectional elevation of the gyroscope.

Referring first to FIG. 1, the gyroscope has a gimbal assembly 1 that is provided with an outer cylindrical shell 10 containing a motor 11. The motor includes a stator 12 which comprises cylindrical coils 13 wound on a soft-iron pole piece 14. The motor 11 also includes a rotor in the form of a cylindrical hysteresis sleeve 15 that embraces and is secured to an inertia ring 16 of similar shape. The inertia ring 16 is supported by means of a hydrodynamic gas-lubricated bearing 17 of conventional form, although alternative bearings such as ball bearings could be used. The bearing 17 comprises an inner cylindrical journal 18 that is formed with spiral patterns of grooves on its outer curved surface 19 which co-operate with the inner smooth surface 20 of the inertia ring 16. Two thrust plates 21 and 22 are secured at opposite ends of the journal 18, the plates being formed with patterns of grooves on their inwardly directed faces which co-operate with the smooth flat ends of the inertia ring 16. Rotation of the inertia ring 16 causes entrainment of gas in the grooves of the journal 18 and the thrust plates 21 and 22 to build up a lubricating gas film between the surfaces. End plates 2 and 3 hermetically seal the gimbal assembly 1 at opposite ends of its shell 10 which may be filled with an inert gas.

Figure 2:
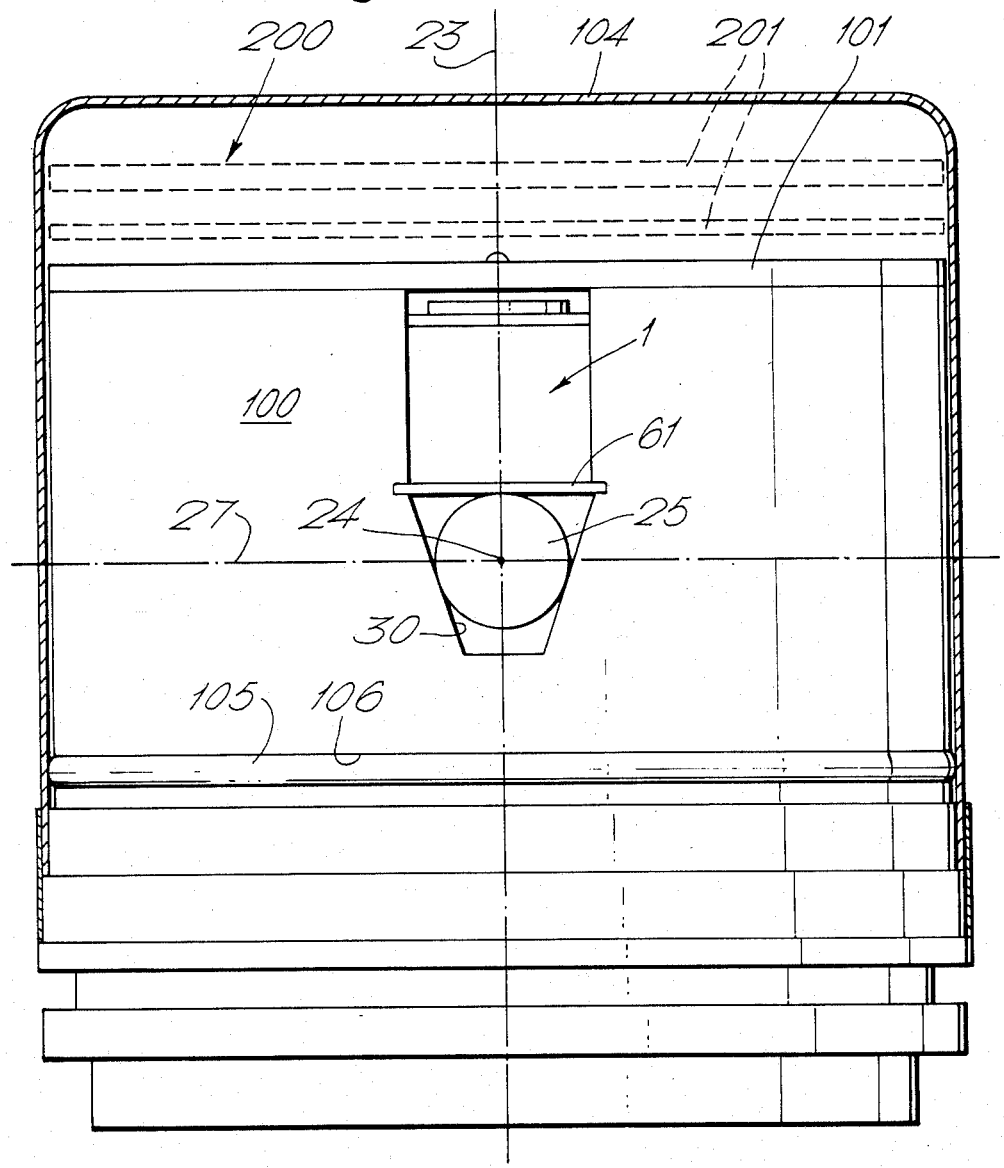
FIG. 2 is a cut-away view from one side of the gyroscope.

The inertia ring 16 and the motor 11 are both mounted concentrically within the gimbal shell 10, the inertia ring being rotated about a concentric vertical spin axis 23. The gimbal assembly 1 itself is mounted for angular displacement about a horizontal rotational axis 24 that lies at right angles to, and passes through the spin axis 23. Mounting of the gimbal assembly 1 is achieved by bearings in the form of two flexure pivots 25 and 26 (such as of the kind described in patent specification No. GB 1545774) that have their inner ends secured to the external surface of the gimbal shell 10 at opposite sides, midway along its length. The outer ends of the flexure pivots 25 and 26 rest in respective V-shape grooves 30 and 31 formed in the base structure 100 of the gyroscope, as shown most clearly in FIG. 2.

A horizontal plate 101 extends across the base structure 100 above the gimbal assembly 1. The plate 101 carries a capacitive pick-off 102 (FIG. 1) that co-operates with an electrode 103 mounted on the top plate 2 of the gimbal assembly 1, so as to sense angular displacement of the gimbal assembly about the horizontal rotational axis 24.

Figure 3:
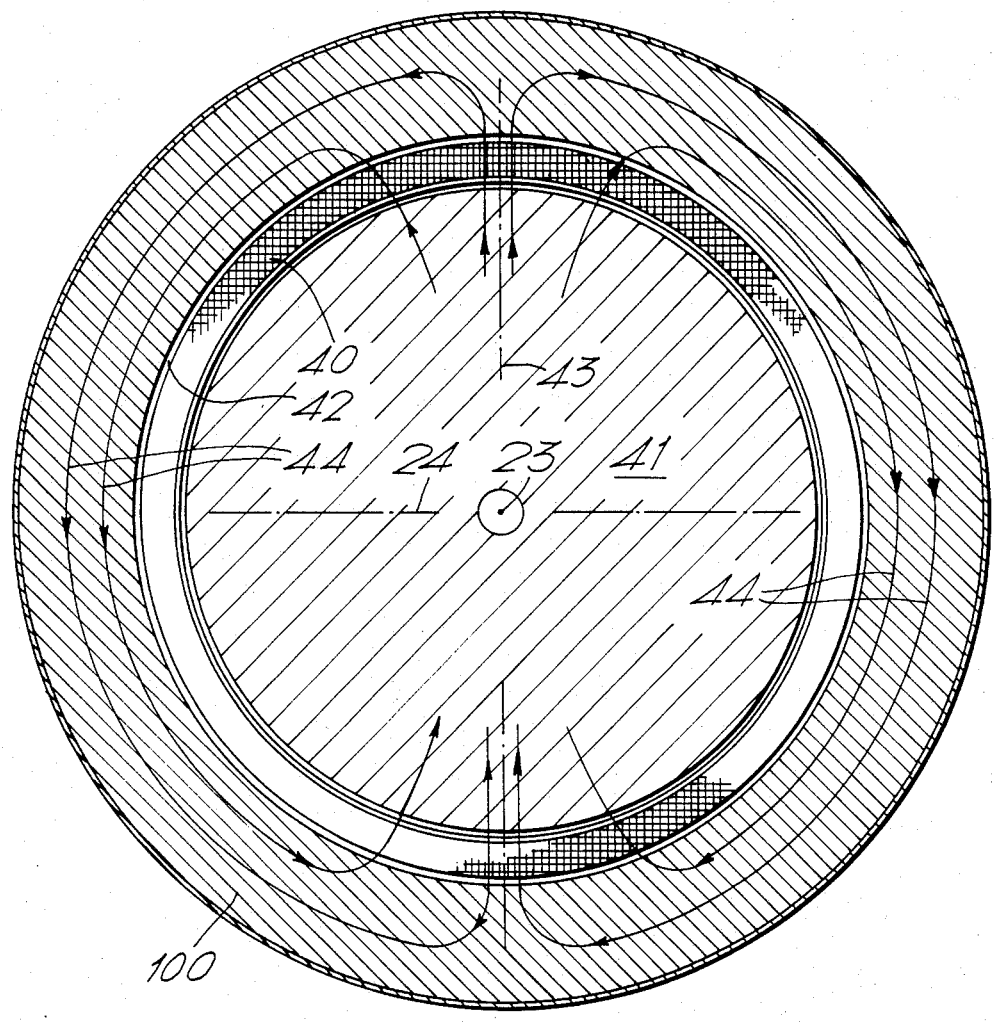
FIG. 3 is a transverse cross-section of the gyroscope along the line III—III of FIG. 1.

At the bottom of the gyroscope there is located a torquer assembly 4 comprising a torquer coil 40 and a magnet 41 of samarium cobalt. The coil 40 is of cylindrical shape and circular section, being secured to the bottom of the gimbal assembly 1, so as to be displaced with the gimbal assembly. The coil 40 is thereby arranged coaxially of the spin axis 23 but is displaced below the rotational axis 24. The magnet 41 is also of cylindrical shape and circular section, being secured to the bottom of the base structure 100. The magnet 41 is thereby axially aligned with the spin axis 23 when the gimbal assembly 1 is in its datum position. The coil 40 extends within an annular gap 42 between the outer curved surface of the magnet 41 and the lower part of the base structure 100, the length of the magnet and coil being substantially equal. The magnet 41 is polarised along a diameter 43 (as shown in FIG. 3) at right angles to the rotational axis 24 so that the lines of flux 44 of the magnet lie in a horizontal plane, cutting the coil 40 and passing through the base structure 100 which acts as a return path.

Above the gimbal assembly 1, on the top plate 101, is mounted the gyroscope electronic control unit 200. The electronic control unit 200 comprises one or more circuit boards 201 stacked vertically above one another. The control unit 200 is connected to receive output signals from the capacitive pick-off 102, and to supply energising signals to the torquer coil 40.

The top of gyroscope is closed by a metal cap 104 which fits over the base structure 100 to enclose the gimbal assembly 1 and the electronic control unit 200. The cap 104 is sealed with the base structure 100 by means of an 'O'ring 105 that lies in an annular recess 106 around the outer surface of the base structure.

A terminal plate 50 seals the bottom of the gyroscope and carries various terminals 51 by which external connection can be made to the control unit 200. The entire gyroscope outside the gimbal assembly 1 may be filled with an inert gas or a damping fluid.

Assembly of the gyroscope is facilitated by its configuration. The gimbal assembly 1 is provided as a sealed unit together with the torquer coil 40 and its bearings 25 and 26. Installation of the gimbal assembly 1 is readily accomplished simply by aligning the bearings 25 and 26 with the V-shape slots 30 and 31, and dropping the assembly into position. Straps 61 and 62, bridging the slots 30 and 31 above the bearings 25 and 26 respectively may be used to secure the bearings in position. The straps 61 and 62 contact the top edge of each bearing 25 and 26 so that they are accurately located at three contact points. The top plate 101, carrying the pick-off 102 may then be secured to the base structure 100, above the gimbal assembly 1. Electronic circuit boards 201 are then electrically connected to the gimbal assembly and stacked on the top plate 101. The gyroscope is completed by sealing the cap 104 about the base structure 100.

In operation, displacement of the gyroscope having a component about the gyroscope input axis 27 (that is the axis which is at right angles to both the spin axis 23 and the rotational axis 24 and which passes through both axes) causes angular displacement of the gimbal assembly 1 about the rotational axis 24. The control unit 200 supplies current to the torquer coil 40 in accordance with the output of the pick-off 102. Current flowing in the coil 40 produces a magnetic field along the axis 23 which interacts with that produced by the permanent magnet 41. With reference to FIG. 3, it can be seen that the flux of the magnet 41 cuts the coil 40 in one sense around half of its circumference and in the other sense around the other half of its circumference. Consequently, when current flows in the coil 40, half the coil will experience an upwards force parallel to the spin axis 23 and the other half will experience a downwards force. This results in a couple tending to twist the coil about its diameter and hence about the rotational axis 24, thereby tending to restore the gimbal assembly. It will be appreciated that the annular gap 42 allows only little movement of the coil and therefore only a restricted angular displacement of the gimbal assembly. The restoring torque is applied to keep the coil 40 centrally of the gap 42 and to prevent contact with the base structure 100 or the magnet 41.

Current supplied to the torque coil 40 is representative of the angular velocity of the gyroscope about the input axis 27. Signals indicative of this current are supplied to the terminals 51 as the output of the gyroscope.

The configuration of the gyroscope has several advantages. By locating the torquer assembly 4 along the spin axis 23 and away from the rotational axis 24, the length of the gyroscope along the rotational axis can be reduced, thereby enabling a gyroscope to be produced having a compact contruction with approximately equal dimensions along each axis. This is a particular advantage where three gyroscopes are needed to be mounted orthogonally on an inertial platform, since they can be arranged in a more compact configuration. The torquer assembly 4 also has the advantage of having a high efficiency, since stray magnetic fields are kept to a minimum by using the base member 100 as a return path. This enables the torquer assembly 4 to capture continuous input rates of up to 1300 degrees/second and contributes to a very high natural frequency of around 257 Hz. The symmetrical configuration of the gyroscope results in its three axes 23, 24 and 27 being coincident thereby helping to improve the stability of the apparatus.

The modular construction makes for easy repair and replacement. It also has the advantage of enabling different gyroscopes to be made by using most of the same components. Thus, for example, a different gimbal assembly could be used with the same base structure 100 and control unit 200, or different bearings could be used. Most importantly, in this context, the control unit 200 can be readily modified by the addition or substitution of circuit boards 201—this enables the same mechanical components to be used with a low-cost gyroscope having a simple control unit as with a more expensive gyroscope having a more sophisticated control unit. If necessary, a taller cap 104 could readily be used to accommodate additional circuit boards.

What we claim is:

1. In a single-axis servoed rate gyroscope of the kind including a gimbal assembly comprising an inertia member and a motor, said motor being arranged to rotate the inertia member about a first axis, said motor and inertia member being arranged concentrically of one another; bearing means mounting the gimbal assembly for angular displacement about a second axis at right angles to the first axis; sensor means for sensing displacement of the gimbal assembly about the second axis; and torquer means mounted with the gimbal assembly and comprising a coil having a plurality of windings and a permanent magnet so that a restoring torque about the second axis can be applied by energizing the windings of the coil; the improvement comprising said coil being of a cylindrical shape and mounted at one end of said gimbal assembly coaxially of the first axis and spaced from the second axis, said permanent magnet being fixedly mounted with the gyroscope so that the major part at least of the magnet extends within said coil coaxially of the first axis and said magnet being polarized radially of said axis such that a part at least of the magnetic field of said magnet passes through the windings of the coil.

2. A gyroscope according to claim 1, wherein said permanent magnet is polarised substantially at right angles to both said first axis and said second axis.

3. A gyroscope according to claim 1, wherein said coil and said permanent magnet are circular in section.

4. A gyroscope according to claim 1, including a cylindrical magnetic element, means mounting said magnetic element so that it surrounds the permanent magnet and thereby provides a magnetic return path for said permanent magnet, and wherein a part at least of said coil extends between said permanent magnet and the said magnetic element.

5. A gyroscope according to claim 4, wherein said magnetic element forms a part of a housing of said gyroscope.

6. A gyroscope according to claim 1, including cylindrical base structure and means mounting said base structure to surround said gimbal assembly, wherein said bearing means includes first and second bearings mounted on opposite sides of said gimbal assembly wherein said base structure is provided with a pair of opposite slots, and wherein said first and second bearings are supported in respective ones of said slots.

7. A gyroscope according to claim 6, wherein a part at least of said slots are of V-shape.

8. A gyroscope according to claim 1, wherein said gimbal assembly is a sealed unit.

9. A gyroscope according to claim 1 including an electronic control unit at one end of the gyroscope, said control unit including a plurality of circuit boards stacked one on top of the other.

10. A single-axis servoed rate gyroscope comprising an outer housing; a sealed gimbal assembly having an inertia ring and a motor arranged to rotate the inertia ring about a first axis; first and second bearings mounted on opposite sides of said gimbal assembly for supporting said gimbal assembly for angular displacement about a second axis at right angles to said first axis; sensor means for sensing displacement of said gimbal assembly about said second axis; and torquer means, said torquer means comprising a cylindrical coil having a plurality of windings mounted at one end of said gimbal assembly coaxially of said first axis and spaced from said second axis, a permanent magnet of cylindrical shape mounted with said gyroscope housing to extend within said coil, the magnet being polarised substantially at right angles to both said first axis and said second axis, and a cylindrical magnetic element surrounding said coil and providing a magnetic return path for said magnet such that a part at least of the magnetic field of said magnet passes through the windings of said coil.

* * * * *